US012655339B2

(12) United States Patent
Aljohar et al.

(10) Patent No.: US 12,655,339 B2
(45) Date of Patent: ***Jun. 16, 2026

(54) PACKER FLUIDS INCLUDING ETHYLENE GLYCOL

(71) Applicant: Saudi Arabian Oil Company, Dhahran (SA)

(72) Inventors: Abdulwahab S. Aljohar, Dhahran (SA); Ali AlSafran, Dhahran (SA); Vikrant Wagle, Abqaiq (SA); Abdulaziz Alhelal, Al Ahsa (SA); Hamzah Nader Abushullaih, Dhahran (SA); Abdullah Saleh Hussain Al-Yami, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,003

(22) Filed: Apr. 30, 2024

(65) Prior Publication Data

US 2025/0333634 A1 Oct. 30, 2025

(51) Int. Cl.
| | |
|---|---|
| *E21B 33/12* | (2006.01) |
| *C09K 8/502* | (2006.01) |
| *C09K 8/54* | (2006.01) |
| *E21B 33/14* | (2006.01) |
| *E21B 37/06* | (2006.01) |

(52) U.S. Cl.
CPC ................ *C09K 8/502* (2013.01); *C09K 8/54* (2013.01); *E21B 33/12* (2013.01); *E21B 33/14* (2013.01); *E21B 37/06* (2013.01); *C09K 2208/32* (2013.01)

(58) Field of Classification Search
None
See application file for complete search history.

(56) References Cited

U.S. PATENT DOCUMENTS

| | | |
|---|---|---|
| 4,077,894 A | 3/1978 | Langdon et al. |
| 4,528,104 A | 7/1985 | House et al. |
| 7,407,599 B2 | 8/2008 | Turcotte et al. |
| 10,077,211 B2 | 9/2018 | Li et al. |
| 11,370,955 B2 | 6/2022 | Wagle et al. |
| 2004/0087448 A1 | 5/2004 | Smith et al. |
| 2011/0065613 A1* | 3/2011 | Leggett ................... E21B 33/10 |
| | | 507/203 |

(Continued)

FOREIGN PATENT DOCUMENTS

| | | |
|---|---|---|
| BR | 112019019600 | 4/2020 |

OTHER PUBLICATIONS

Jeu et al., "Systematic Approach to Selecting Completion Fluids for Deepwater Subsea Wells Reduces Completion Problems," Prepared for presentation at the AADE 2002 Technology Conference "Drilling & Completion Fluids and Waste Management," held at the Radisson Astrodome Houston, Texas, Apr. 2-3, 2002 in Houston, Texas, 9 pages.

(Continued)

*Primary Examiner* — Andrew Sue-Ako
(74) *Attorney, Agent, or Firm* — Fish & Richardson P.C.

(57) ABSTRACT

The present disclosure relates to packer fluids including a hydrocarbon and ethylene glycol, to methods for treating a wellbore with such packer fluids, and to wellbores including such packer fluids disposed in an annulus thereof.

20 Claims, 2 Drawing Sheets

Provide Packer Fluid — 202

Inject Packer Fluid into Annulus — 204

(56)         References Cited

U.S. PATENT DOCUMENTS

| | | | |
|---|---|---|---|
| 2015/0299558 A1* | 10/2015 | Sui | E21B 36/003 |
| | | | 507/226 |
| 2016/0024367 A1* | 1/2016 | Zha | C09K 8/52 |
| | | | 166/308.2 |
| 2016/0122614 A1* | 5/2016 | Mcdaniel | C09K 8/03 |
| | | | 507/119 |
| 2020/0017745 A1 | 1/2020 | Dietl et al. | |

OTHER PUBLICATIONS

U.S. Appl. No. 18/650,920, Abushullaih et al., filed Apr. 30, 2024.

* cited by examiner

PACKER FLUIDS INCLUDING ETHYLENE GLYCOL

TECHNICAL FIELD

The present disclosure relates to packer fluids including a hydrocarbon and ethylene glycol.

BACKGROUND

Completion of oil and gas wells typically involves placement of packer fluids into a casing anulus above a packer. Conventional packer fluids include aqueous and non-aqueous based hydrocarbon fluids, and can fill the annular column to the surface. Packer fluids can provide pressure stability to the casing anulus, for example by providing hydrostatic pressure to equalize pressure relative to the formation, to lower pressure across sealing elements or packers, or to limit differential pressure acting on the wellbore, casing, and production tubing. Packer fluids can also provide thermal protecting to the casing anulus, for example in areas subject to low ambient temperatures, protecting against compressive or tension loads that would otherwise result from freezing of wellbore fluids.

Though conventional, salt-based aqueous packer fluids can be economically efficient and convenient, such fluids can carry a high risk of corrosion. Such aqueous packer fluids can contribute to polymer degradation at bottom-hole conditions-because these packer fluids can have a decreased ability to withstand high temperatures and pressures, barite sagging and settling of the packer can occur. Though conventional, salt-containing non-aqueous packer fluids (oil-based packer fluids) can avoid certain of these drawbacks, such packer fluids are typically highly thermally conductive, which can also contribute to packer damage.

Therefore, there is a need for improved packer fluids.

SUMMARY

Provided in the present disclosure is a method of treating a wellbore, including providing a packer fluid including a hydrocarbon and ethylene glycol, present in the packer fluid in a weight ratio of about 100:1 to about 1:1; and injecting the packer fluid into an annulus of the wellbore.

Also provided in the present disclosure is a method of preventing corrosion in a wellbore, including providing a packer fluid including a hydrocarbon and ethylene glycol, present in the packer fluid in a weight ratio of about 100:1 to about 1:1; and contacting a metal surface of the wellbore with the packer fluid.

Also provided in the present disclosure is a wellbore including an annulus; a packer disposed within the annulus; and a packer fluid disposed within the annulus and adjacent the packer; wherein the packer fluid includes a hydrocarbon and ethylene glycol, present in the packer fluid in a weight ratio of about 100:1 to about 1:1.

DETAILED DESCRIPTION

Figure 1:
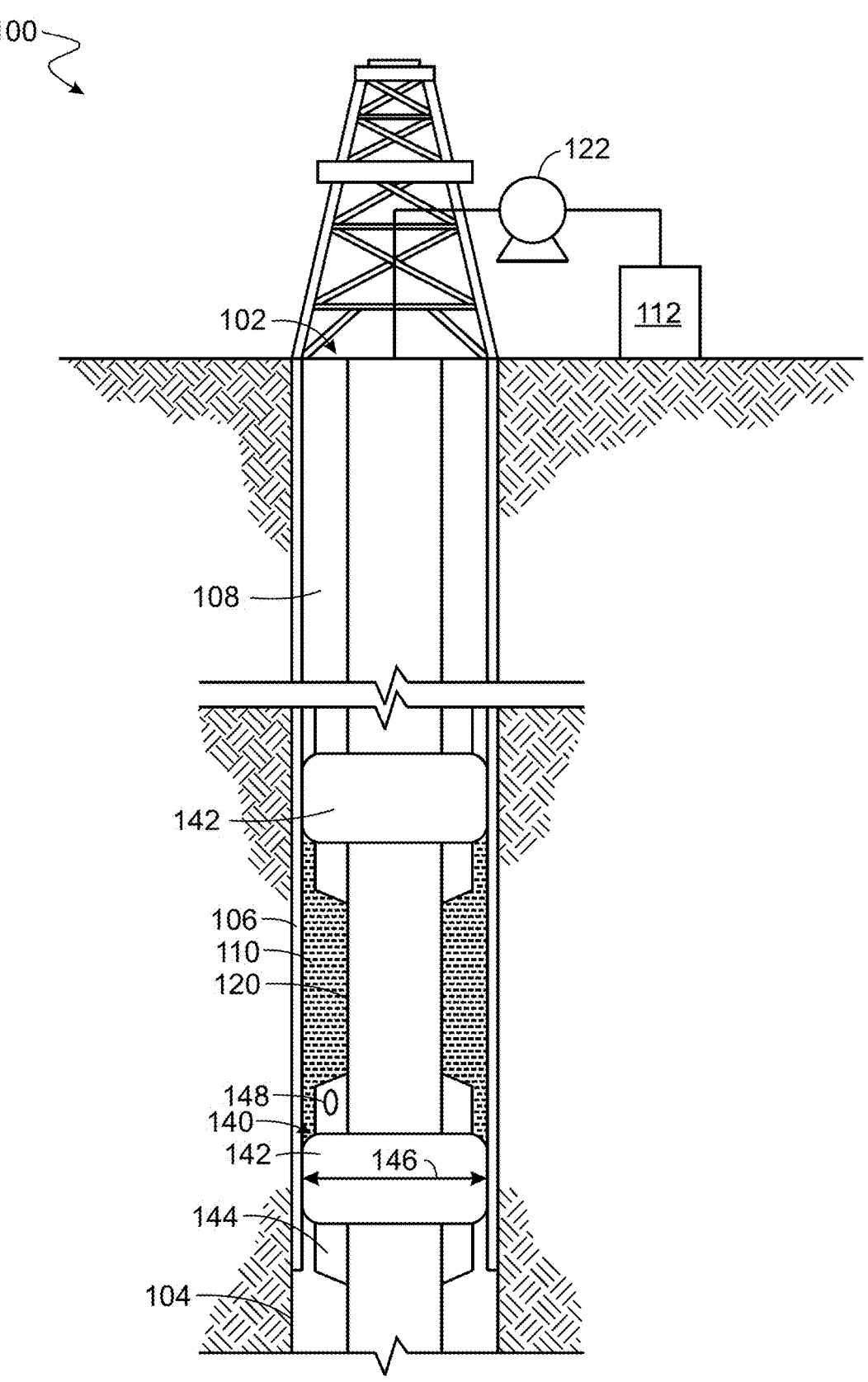
FIG. 1 is a schematic illustration of a system including cased wellbore including a tubing-casing annulus.

The present disclosure relates to packer fluids including a hydrocarbon and ethylene glycol, to methods for treating a wellbore with such packer fluids, and to wellbores including such packer fluids disposed in an annulus thereof. Because ethylene glycol can passivate metal surfaces, the packer fluids of the present disclosure can mitigate corrosion in downhole applications, as compared to conventional packer fluids, such as salt-containing packer fluids. The basicity of the packer fluids of the present disclosure can also mitigate corrosion of metal surfaces under acidic conditions. And because pure water typically accelerates metal corrosion, the decreased water content of the packer fluids of the present disclosure as compared to conventional aqueous packer fluids can further help to limit corrosion.

Due to the higher boiling point and lower freezing point of the packer fluids of the present disclosure as compared to conventional aqueous packer fluids, the packer fluids of the present disclosure can better withstand extreme temperatures, and help to limit packer damage resulting from, for example, high temperatures. The packer fluids of the present disclosure can better avoid solid settling or barite sagging, as compared to conventional packer fluids, such as salt-containing packer fluids. The packer fluids of the present disclosure can accordingly help to maintain the condition of a packer disposed within an annulus of a wellbore, mitigating issues such as tubing-casing annulus (TCA) or casing-casing annulus (CCA) leaks that can result from packer degradation.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

The terms "a," "an," and "the" are used in the present disclosure to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

As used in the present disclosure, the term "about" can allow for a degree of variability in a value or range, for example, within 10%, within 5%, or within 1% of a stated value or of a stated limit of a range.

In the methods of the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, the term "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Injecting a material in a subterranean formation can include contacting the material with any section of a wellbore or with any subterranean region in fluid contact therewith. Subterranean materials can include any materials placed into the wellbore such as cement, drill shafts, liners, tubing, casing, or screens; injecting a material in a subterranean formation can include contacting with such subterranean materials. In some examples, a subterranean formation or material can be any below-ground region that can produce liquid or gaseous petroleum materials, water, or any section below-ground in fluid contact therewith.

Packer Fluid

Provided in the present disclosure are packer fluids including a hydrocarbon and ethylene glycol. The hydrocarbon and ethylene glycol can be present in the packer fluid in a weight ratio (of hydrocarbon:ethylene glycol) of about 100:1 to about 1:1, about 100:1 to about 2:1, about 100:1 to about 5:1, about 50:1 to about 1:1, about 50:1 to about 2:1, about 50:1 to about 5:1, about 25:1 to about 1:1, about 25:1 to about 2:1, or about 25:1 to about 5:1. In some embodiments, the hydrocarbon and ethylene glycol are present in the packer fluid in a weight ratio of about 5:1, about 6:1, about 7:1, about 8:1, about 9:1, about 10:1, about 11:1, about 12:1, about 13:1, about 14:1, or about 15:1.

In some embodiments, the hydrocarbon includes an oil. In some embodiments, the oil includes a synthetic oil including an ester, an olefin, or both. In some embodiments, the oil includes diesel, kerosene, or both. In some embodiments, the oil includes a mineral oil including an n-paraffin, an iso-paraffin, a cyclic alkane, a branched alkane, or any combination thereof. In some embodiments, the hydrocarbon includes diesel.

In some embodiments, the packer fluid further includes water, for example, about 1 wt % to about 60 wt %, about 1 wt % to about 45 wt %, about 1 wt % to about 35 wt %, about 1 wt % to about 25 wt %, about 2.5 wt % to about 60 wt %, about 2.5 wt % to about 45 wt %, about 2.5 wt % to about 35 wt %, about 2.5 wt % to about 25 wt %, about 5 wt % to about 60 wt %, about 5 wt % to about 45 wt %, about 5 wt % to about 35 wt %, about 5 wt % to about 25 wt %, about 10 wt % to about 60 wt %, about 10 wt % to about 45 wt %, about 10 wt % to about 35 wt %, or about 10 wt % to about 25 wt % water. In some embodiments, the packer fluid includes about 2.5 wt %, about 5 wt %, about 7.5 wt %, about 10 wt %, about 12.5 wt %, or about 15 wt % water. In some embodiments, the packer fluid includes an oil to water ratio (OWR) of about 40:60 to about 90:10, for example, about 40:60 to about 80:20, about 40:60 to about 70:30, about 50:50 to about 90:10, about 50:50 to about 80:20, about 50:50 to about 70:30, about 60:40 to about 90:10, about 60:40 to about 80:20, or about 60:40 to about 70:30.

In some embodiments, the packer fluid includes about 1 wt % to about 45 wt % ethylene glycol, for example, about 1 wt % to about 35 wt %, about 1 wt % to about 25 wt %, about 2.5 wt % to about 45 wt %, about 2.5 wt % to about 35 wt %, about 2.5 wt % to about 25 wt %, about 5 wt % to about 45 wt %, about 5 wt % to about 35 wt %, or about 5 wt % to about 25 wt % ethylene glycol. In some embodiments, the packer fluid includes about 2.5 wt %, about 5 wt %, about 7.5 wt %, about 10 wt %, about 12.5 wt %, or about 15 wt % ethylene glycol.

In some embodiments, the packer fluid includes about 50 wt % to about 95 wt % hydrocarbon, for example, about 50 wt % to about 85 wt %, about 50 wt % to about 80 wt %, about 60 wt % to about 95 wt %, about 60 wt % to about 85 wt %, about 60 wt % to about 80 wt %, about 65 wt % to about 95 wt %, about 65 wt % to about 85 wt %, or about 65 wt % to about 80 wt %. In some embodiments, the packer fluid includes about 60 wt %, about 65 wt %, about 70 wt %, about 75 wt %, about 80 wt %, about 85 wt %, or about 90 wt % hydrocarbon.

In some embodiments, the hydrocarbon, water, and ethylene glycol make up at least about 75 wt %, at least about 80 wt %, at least about 85 wt %, at least about 90 wt %, at least about 95 wt %, at least about 97.5 wt %, at least about 98 wt %, at least about 99 wt %, or at least about 99.5 wt % of the packer fluid.

In some embodiments, the packer fluid further includes a weighting agent. In some embodiments, the weighting agent includes barite, manganese tetroxide, marble dust, or any combination thereof. In some embodiments, the weighting agent includes barite. In some embodiments, the weighting agent includes marble dust. In some embodiments, an average particle size of the marble dust is about 1 μm to about 100 μm, about 1 μm to about 50 μm, about 1 μm to about 25 μm, about 2.5 μm to about 100 μm, about 2.5 μm to about 50 μm, about 2.5 μm to about 25 μm, about 5 μm to about 100 μm, about 5 μm to about 50 μm, or about 5 μm to about 25 μm. In some embodiments, an average particle size of the marble dust is about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, or about 24 μm.

In some embodiments, the packer fluid includes about 25 wt % to about 73 wt % weighting agent, for example, about 25 wt % to about 65 wt %, about 25 wt % to about 60 wt %, about 35 wt % to about 73 wt %, about 35 wt % to about 65 wt %, about 35 wt % to about 60 wt %, about 40 wt % to about 73 wt %, about 40 wt % to about 65 wt %, or about 40 wt % to about 60 wt % weighting agent. In certain such embodiments, the packer fluid includes about 20 wt % to about 70 wt % hydrocarbon, for example, about 20 wt % to about 55 wt %, about 20 wt % to about 50 wt %, about 25 wt % to about 70 wt %, about 25 wt % to about 55 wt %, about 25 wt % to about 50 wt %, about 30 wt % to about 70 wt %, about 30 wt % to about 55 wt %, or about 30 wt % to about 50 wt % hydrocarbon.

In certain such embodiments, the packer fluid includes about 1 wt % to about 35 wt % ethylene glycol, for example, about 1 wt % to about 25 wt %, about 1 wt % to about 15 wt %, about 2 wt % to about 35 wt %, about 2 wt % to about 25 wt %, about 2 wt % to about 15 wt %, about 2.5 wt % to about 35 wt %, about 2.5 wt % to about 25 wt %, or about 2.5 wt % to about 25 wt % ethylene glycol. In certain such embodiments, the packer fluid includes about 1 wt % to about 35 wt % water, for example, about 1 wt % to about 25 wt %, about 1 wt % to about 20 wt %, about 2.5 wt % to about 35 wt %, about 2.5 wt % to about 25 wt %, about 2.5 wt % to about 20 wt %, about 5 wt % to about 35 wt %, about 5 wt % to about 25 wt %, or about 5 wt % to about 20 wt % water.

In some embodiments, the weighting agent, hydrocarbon, water, and ethylene glycol make up at least about 75 wt %, at least about 80 wt %, at least about 85 wt %, at least about 90 wt %, at least about 95 wt %, at least about 97.5 wt %, at least about 98 wt %, at least about 99 wt %, or at least about 99.5 wt % of the packer fluid.

In some embodiments the packer fluid further includes an additive. For example, in some embodiments, the packer fluid includes an emulsifier, a viscosifier, a filtration control agent, a drill-in fluid, a weighting agent, an inert solid, a fluid loss control agent, a salt, a dispersion aid, a corrosion inhibitor, an emulsion thinner, an emulsion thickener, a high-pressure, high-temperature emulsifier-filtration control agent, or any combination thereof.

In some embodiments, the packer fluid does not includes salts such as calcium chloride and sodium bromide. In some embodiments, the packer fluid includes less than about 10 wt % of a salt, for example, less than about 5 wt %, less than about 4 wt %, less than about 3 wt %, less than about 2 wt %, less than about 1 wt %, or less than about 0.5 wt % of a salt. In some embodiments, the packer fluid is substantially free from salts.

Methods

The methods of the present disclosure include providing a packer fluid including a hydrocarbon and ethylene glycol, and injecting the packer fluid into an annulus of the wellbore. In some embodiments, the packer fluid is a packer fluid of the present disclosure. For example, in some embodiments, the packer fluid includes a hydrocarbon and ethylene glycol, present in the packer fluid in a weight ratio of about 100:1 to about 1:1, optionally including water, a weighting agent, or both, and optionally substantially free from salts. In some embodiments, injecting the packer fluid includes pumping the packer fluid into the annulus of the wellbore.

The methods of the present disclosure also include providing a packer fluid including a hydrocarbon and ethylene glycol, and contacting a metal surface of the wellbore with the packer fluid. In some embodiments, the packer fluid is a packer fluid of the present disclosure. For example, in some embodiments, the packer fluid includes a hydrocarbon and ethylene glycol, present in the packer fluid in a weight ratio of about 100:1 to about 1:1, optionally including water, a weighting agent, or both, and optionally substantially free from salts. In some embodiments, the metal surface includes a metal surface of an annulus of the wellbore, such as a metal surface of a tubing-casing annulus or a casing-casing annulus.

FIG. 1 is a schematic illustration of a system 100 including a downhole tubing 120 that is a production tubing extending through a cased wellbore 102, where the wellbore wall 104 is lined with a casing 106. In the illustrated embodiment, the wellbore 102 includes a tubing-casing annulus 108 between the casing 104 and downhole tubing 120. In other embodiments (not shown), the wellbore includes a casing-casing annulus between a first casing and a second casing of the wellbore, additionally or alternatively to the tubing-casing annulus.

The annulus 108 can be at least partially sealed with one packer assembly 140. The packer assembly 140 can include at least one packer 142, running into the wellbore 102 with a smaller initial outside diameter that then radially expands externally to larger outside diameter 146 to seal a portion of the wellbore 102. Examples of packer assemblies include production or test packers and inflatable packers. Production packers may be activated, or expanded, by squeezing the packer sealing element between two rigid structure, thereby forcing the sides of the packer to bulge outward. Inflatable packers may be activated, or expanded, by pumping a fluid into a bladder. Production packers are commonly set in cased portions of a well, and inflatable packers are commonly set in both open hole portions and cased portions of a well.

The packer assembly 140 may include at least one activation mechanism 144 used to radially expand the packer(s) 142 from a smaller initial diameter to a larger diameter 146 capable of sealing a portion of the well 102. When the annular space 108 is sealed by the packer assembly 140, the packer fluid 110 may be pumped (using one or more pumps 122) from storage tank 112 into the sealed area of the tubing-casing annulus 108. In some embodiments (not shown), before injecting the packer fluid, the annulus includes a brine, and injecting the packer fluid includes displacing the brine.

In the illustrated embodiment, the packer assembly 140 may include at least one bypass line 148 fluidly connecting the interior flow path of the tubing 120 to the annular space 108 around the outside of the tubing 120. One or more valves within the bypass line 148 may controllably allow fluid flow through the packer assembly 140. In some embodiments, the packer fluid 110 may be pumped into the annular space 108 through one or more valved openings in the tubing 120.

Wellbores

Also provided in the present disclosure are wellbores including an annulus, a packer disposed in the annulus, and a packer fluid including a hydrocarbon and ethylene glycol, the packer fluid disposed within the annulus and adjacent the packer. In some embodiments, the packer fluid is a packer fluid of the present disclosure. In some embodiments, the wellbore is formed by a method of the present disclosure. For example, in some embodiments, the packer fluid includes a hydrocarbon and ethylene glycol, present in the packer fluid in a weight ratio of about 100:1 to about 1:1, optionally including water, a weighting agent, or both, and optionally substantially free from salts.

Figure 2:
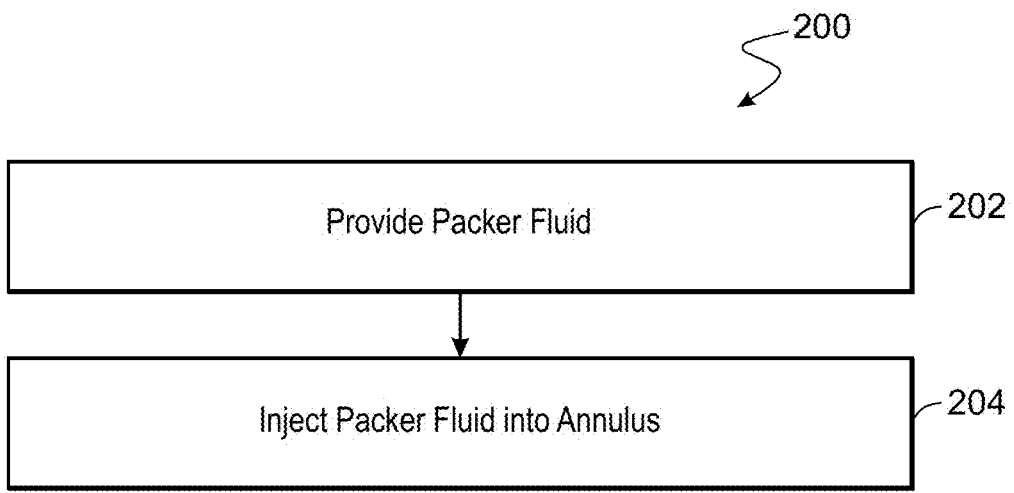
FIG. 2 is a block flow diagram of a method for treating a wellbore.

FIG. 2 is a process flow diagram of a method 200 for treating a wellbore. The method starts at block 202 with the provision of a packer fluid. At block 204 of the method, the packer fluid is injected into an annulus of the wellbore.

EXAMPLES

Example 1. Packer Rubber Degradation

Coupons of packer rubber were exposed to one of packer fluid A (prepared according to Table 1) or comparative packer fluid C1 (prepared according to Table 1), or comparative packer fluid C2 (100% diesel). The properties of each coupon before and after exposure are shown in Tables 2-4.

TABLE 1

| Additive | Mixing Time (min) | Fluid A (ppb) | Fluid C1 (ppb) |
|---|---|---|---|
| Packer Fluid Preparation and Composition | | | |
| Diesel | | 173.4 | 173.4 |
| Primary Emulsifier | 5 | 7 | 7 |
| Secondary Emulsifier | 5 | 4 | 4 |
| Viscosifier | 5 | 8 | 8 |
| Filtration Control Agent | 5 | 6 | 6 |
| Drill-In Fluid | 5 | 1.5 | 1.5 |
| Water | 10 | 50.8 | 50.8 |
| Ethylene Glycol or Salt | | 17.8 (Ethylene Glycol) | 17.8 ($CaCl_2$) |
| Barite | 5 | 215.3 | 215.3 |
| Marble (fine) | 2 | 10 | 10 |
| Marble (medium) | 2 | 15 | 15 |

TABLE 2

Packer Fluid A - Coupon diameter expansion

| Parameter | Before | After | % Change |
|---|---|---|---|
| Diameter (in.) | 2.7550 | 2.7725 | +1.75% |

TABLE 3

Packer Fluid C1 - Coupon diameter expansion

| Parameter | Before | After | % Change |
|---|---|---|---|
| Diameter (in.) | 2.770 | 2.8685 | +9.85% |

TABLE 4

Packer Fluid C2 - Coupon property changes

| Parameter | BHR | AHR |
|---|---|---|
| Weight | 3.7497 g | 3.8512 g |
| Thickness | 0.13 in. | 0.14 in. |
| Diameter | 2.76 in. | 3.01 in. |

As shown in Tables 2-4, oil-based packer fluids C1 and C2 damaged the packer rubber more than the other tested fluids. The results demonstrate that an ethylene glycol-water-hydrocarbon mixture maintained the packer rubber with minimal damage and no corrosion, even after exposure to elevated temperatures.

Embodiments

Certain embodiments of the present disclosure are provided in the following list:

Embodiment 1. A method of treating a wellbore, comprising
providing a packer fluid comprising a hydrocarbon and ethylene glycol, present in the packer fluid in a weight ratio of about 100:1 to about 1:1; and
injecting the packer fluid into an annulus of the wellbore.

Embodiment 2. The method of embodiment 1, wherein the hydrocarbon and ethylene glycol are present in the packer fluid in a weight ratio of about 50:1 to about 5:1.

Embodiment 3. The method of embodiment 1, wherein the hydrocarbon and ethylene glycol are present in the packer fluid in a weight ratio of about 25:1 to about 5:1.

Embodiment 4. The method of any one of embodiments 1-3, wherein the hydrocarbon comprises an oil.

Embodiment 5. The method of embodiment 4, wherein the oil comprises a synthetic oil, diesel, kerosene, a mineral oil, or any combination thereof.

Embodiment 6. The method of embodiment 4, wherein the oil comprises diesel.

Embodiment 7. The method of any one of embodiments 1-6, wherein the packer fluid further comprises water.

Embodiment 8. The method of embodiment 7, wherein the packer fluid comprises an oil to water ratio (OWR) of about 40:60 to about 90:10.

Embodiment 9. The method of embodiment 7 or embodiment 8, wherein the packer fluid comprises
about 50 wt % to about 95 wt % hydrocarbon;
about 1 wt % to about 45 wt % ethylene glycol; and
about 1 wt % to about 45 wt % water.

Embodiment 10. The method of embodiment 7 or embodiment 8, wherein the packer fluid comprises
about 50 wt % to about 95 wt % hydrocarbon;
about 2 wt % to about 15 wt % ethylene glycol; and
about 3 wt % to about 35 wt % water.

Embodiment 11. The method of any one of embodiments 1-10, wherein the packer fluid further comprises a weighting agent.

Embodiment 12. The method of embodiment 11, wherein the weighting agent comprises barite, manganese tetroxide, marble dust, or any combination thereof.

Embodiment 13. The method of embodiment 12, wherein the weighting agent comprises barite.

Embodiment 14. The method of embodiment 12 or embodiment 13, wherein the weighting agent comprises marble dust.

Embodiment 15. The method of embodiment 14, wherein an average particle size of the marble dust is about 1 μm to about 100 μm.

Embodiment 16. The method of embodiment 14, wherein an average particle size of the marble dust is about 5 μm to about 50 μm.

Embodiment 17. The method of any one of embodiments 11-16, wherein the packer fluid comprises
about 20 wt % to about 70 wt % hydrocarbon;
about 1 wt % to about 35 wt % ethylene glycol;
about 1 wt % to about 35 wt % water; and
about 25 wt % to about 73 wt % weighting agent.

9 / 10

Embodiment 18. The method of any one of embodiments 11-16, wherein the packer fluid comprises
about 20 wt % to about 55 wt % hydrocarbon;
about 3 wt % to about 15 wt % ethylene glycol;
about 7 wt % to about 25 wt % water; and
about 35 wt % to about 65 wt % weighting agent.

Embodiment 19. The method of any one of embodiments 1-18, wherein the packer fluid comprises less than about 5 wt % of a salt.

Embodiment 20. The method of any one of embodiments 1-18, wherein the packer fluid is substantially free from salt.

Embodiment 21. The method of any one of embodiments 1-20, wherein the annulus comprises a brine before injecting the packer fluid, and injecting the packer fluid displaces the brine from the annulus.

Embodiment 22. The method of any one of embodiments 1-21, wherein the annulus comprises a tubing-casing anulus.

Embodiment 23. The method of any one of embodiments 1-21, wherein the annulus comprises a casing-casing anulus.

Embodiment 24. A method of preventing corrosion in a wellbore, comprising
providing a packer fluid comprising a hydrocarbon and ethylene glycol, present in the packer fluid in a weight ratio of about 100:1 to about 1:1; and
contacting a metal surface of the wellbore with the packer fluid.

Embodiment 25. The method of embodiment 24, wherein the metal surface comprises a surface of an annulus of the wellbore.

Embodiment 26. A wellbore comprising:
an annulus;
a packer disposed within the annulus; and
a packer fluid disposed within the annulus and adjacent the packer;
wherein the packer fluid comprises a hydrocarbon and ethylene glycol, present in the packer fluid in a weight ratio of about 100:1 to about 1:1.

Embodiment 27. The wellbore or embodiment 26, wherein the packer fluid further comprises water.

Embodiment 28. The wellbore of embodiment 27, wherein the packer fluid comprises
about 50 wt % to about 95 wt % hydrocarbon;
about 1 wt % to about 45 wt % ethylene glycol; and
about 1 wt % to about 45 wt % water.

Embodiment 29. The method of any one of embodiments 26-28, wherein the packer fluid further comprises a weighting agent.

Embodiment 30. The method of embodiment 29, wherein the packer fluid comprises
about 25 wt % to about 70 wt % hydrocarbon;
about 1 wt % to about 35 wt % ethylene glycol;
about 1 wt % to about 35 wt % water; and
about 25 wt % to about 73 wt % weighting agent.

Other implementations are also within the scope of the following claims.

What is claimed is:
1. A method of treating a wellbore, comprising:
providing a packer fluid comprising:
about 20 wt % to about 55 wt % of a hydrocarbon;
about 3 wt % to about 15% of ethylene glycol; and
about 7 wt % to about 25 wt % of water;
wherein the hydrocarbon and the ethylene glycol are present in the packer fluid in a weight ratio of about 100:1 to 1:1; and
injecting the packer fluid into an annulus of the wellbore, wherein the wellbore contains packer rubber, and wherein the packer rubber, when exposed to the packer fluid, expands by less than 9%.

2. The method of claim 1, wherein the hydrocarbon comprises an oil.

3. The method of claim 2, wherein the oil comprises a synthetic oil, diesel, kerosene, a mineral oil, or any combination thereof.

4. The method of claim 2, wherein the oil comprises diesel.

5. The method of claim 1, wherein the packer fluid comprises an oil to water ratio (OWR) of about 40:60 to about 90:10.

6. The method of claim 1, wherein the packer fluid comprises less than about 5 wt % of a salt.

7. The method of claim 1, wherein the packer fluid is substantially free from salt.

8. The method of claim 1, wherein the annulus comprises a brine before injecting the packer fluid, and injecting the packer fluid displaces the brine from the annulus.

9. The method of claim 1, wherein the annulus comprises a tubing-casing anulus.

10. The method of claim 1, wherein the annulus comprises a casing-casing anulus.

11. The method of claim 1, wherein the packer fluid further comprises about 35 wt % to about 65 wt % of a weighting agent.

12. The method of claim 11, wherein the weighting agent comprises barite, manganese tetroxide, marble dust, or any combination thereof.

13. The method of claim 12, wherein the weighting agent comprises barite.

14. The method of claim 12, wherein the weighting agent comprises marble dust.

15. The method of claim 14, wherein an average particle size of the marble dust is about 1 μm to about 100 μm.

16. The method of claim 14, wherein an average particle size of the marble dust is about 5 μm to about 50 μm.

17. A method of preventing corrosion in a wellbore, comprising:
providing a packer fluid comprising:
about 20 wt % to about 55 wt % of a hydrocarbon;
about 3 wt % to about 15% of ethylene glycol; and
about 7 wt % to about 25 wt % of water; and
wherein the hydrocarbon and the ethylene glycol are present in the packer fluid in a weight ratio of about 100:1 to 1:1; and
contacting a metal surface of the wellbore with the packer fluid,
wherein the wellbore contains packer rubber, and wherein the packer rubber, when exposed to the packer fluid, expands by less than 9%.

18. The method of claim 17, wherein the metal surface comprises a surface of an annulus of the wellbore.

19. The method of claim 17, wherein the packer fluid further comprises about 35 wt % to about 65 wt % of a weighting agent.

20. A wellbore comprising:
an annulus;
a packer disposed within the annulus; and
a packer fluid disposed within the annulus and adjacent the packer;
wherein the packer fluid comprises:
about 20 wt % to about 55 wt % of a hydrocarbon;
about 3 wt % to about 15% of ethylene glycol; and
about 7 wt % to about 25 wt % of water, wherein the hydrocarbon and the ethylene glycol are present in the packer fluid in a weight ratio of about 100:1 to 1:1, wherein the wellbore contains packer rubber, and wherein the packer rubber, when exposed to the packer fluid, expands by less than 9%.

* * * * *